(12) United States Patent
Ökvist et al.

(10) Patent No.: US 11,419,061 B2
(45) Date of Patent: Aug. 16, 2022

(54) ALTITUDE DEPENDENT UPLINK POWER CONTROL

(71) Applicant: Telefonaktiebolaget LM Ericsson (publ), Stockholm (SE)

(72) Inventors: Peter Ökvist, Luleå (SE); Arne Simonsson, Gammelstad (SE); Tommy Arngren, Södra Sunderbyn (SE); Stefan Wänstedt, Luleå (SE)

(73) Assignee: Telefonaktiebolaget LM Ericsson (Publ) Stockholn, Stockholm (SE)

( * ) Notice: Subject to any disclaimer, the term of this patent is extended or adjusted under 35 U.S.C. 154(b) by 33 days.

(21) Appl. No.: 16/970,204

(22) PCT Filed: Oct. 16, 2018

(86) PCT No.: PCT/SE2018/051051
§ 371 (c)(1),
(2) Date: Aug. 14, 2020

(87) PCT Pub. No.: WO2019/160461
PCT Pub. Date: Aug. 22, 2019

(65) Prior Publication Data
US 2021/0084598 A1    Mar. 18, 2021

Related U.S. Application Data

(60) Provisional application No. 62/631,310, filed on Feb. 15, 2018.

(51) Int. Cl.
*H04W 52/04*    (2009.01)
*H04W 52/28*    (2009.01)
(Continued)

(52) U.S. Cl.
CPC ............ *H04W 52/283* (2013.01); *G01C 5/00* (2013.01); *H04W 52/146* (2013.01); *H04W 52/242* (2013.01)

(58) Field of Classification Search
CPC ......... B64C 39/02; B64C 29/00; B64C 27/00; B64C 27/08; B64C 39/00; B64C 11/00;
(Continued)

(56) References Cited

U.S. PATENT DOCUMENTS

2018/0288713 A1* 10/2018 Kosseifi .................. H04W 8/24

FOREIGN PATENT DOCUMENTS

| WO | 2017188453 A1 | 11/2017 |
|---|---|---|
| WO | 2018175252 A1 | 9/2018 |
| WO | 2018203402 A1 | 11/2018 |

OTHER PUBLICATIONS

Indian Office Action dated Sep. 22, 2021 for Patent Application No. 202017038041, consisting of 6-pages.
(Continued)

*Primary Examiner* — Tu X Nguyen
(74) *Attorney, Agent, or Firm* — Christopher & Weisberg, P.A.

(57) ABSTRACT

In SIB2 there is an entry containing information on PUSCH power control parameters. The current signaling entity is extended with entries that are dependent on UE operational altitude. For example, an altitude-dependent factor for the alpha parameter, or one parameter range for zero (ground level, default as per of today), one parameter range for intermediate altitude operation, and one entry for high-altitude operations, so that an airborne UE can select its appropriate power control parameters.

4 Claims, 9 Drawing Sheets

(51) Int. Cl.
  *G01C 5/00* (2006.01)
  *H04W 52/14* (2009.01)
  *H04W 52/24* (2009.01)

(58) Field of Classification Search
  CPC ......... B64C 27/20; B64C 31/06; B64C 27/04;
   B64C 9/00; B64C 19/00; H04W 52/04;
   H04W 52/08; H04W 52/18; H04W 52/38;
   H04W 52/54; H04W 52/10; H04W 52/06
  See application file for complete search history.

(56) References Cited

OTHER PUBLICATIONS

EPO Communication and European Search Report dated Oct. 5, 2021 for Patent Application No. 18906510.5, consisting of 9-pages.
3GPP 36.331 V15.0.1; 3rd Generation Partnership Project; Technical Specification Group Radio Access Network Evolved Universal Terrestrial Radio Access (E-UTRA); Radio Resource Control (RRC); Protocol specification (Release 15); Jan. 2018, consisting of 776-pages.
3GPP TS 36.777 V15.0.0; 3rd Generation Partnership Project; Technical Specification Group Radio Access Network; Study on Enhanced LTE Support for Aerial Vehicles (Release 15); Dec. 2017, consisting of 89-pages.
International Search Report dated May 2, 2019 for International Application No. PCT/SE2018/051051 filed on Oct. 16, 2018, consisting of 13-pages.
R1-1720110; 3GPP TSG-RAN WG1 Meeting #91; Title: UL Enhancements for Drones; Source: Huawei, HiSilicon; Agenda Item: 6.2.7 3; Document for: Discussion and Decision; Date and Location: Nov. 27-Dec. 1, 2017, Reno, USA; Consisting of 4-pages.
R1-1714055; 3GPP TSG-RAN WG1 #90 ; Title: Interference mitigation techniques for aerial vehicles; Source: Sony; Agenda Item: 5.2.8.1; Document for: Discussion; Date and Location: Aug. 21-25, 2017, Prague, Czech Republic; consisting of 2-pages.
R1-1718298; 3GPP TSG-RAN WG1 #90-BIS;Title: Interference Detection for Aerial Vehicles; Source: Sequans Communications; Agenda Item: 6.2.7.4; Document for: Discussion; Date and Location: Oct. 9-13, 2017 Prague, Czech Republic; consisting of 3-pages.
Uplink Power Control in LTE—Overview and Performance; Principles and Benefits of Utilizing rather than Compensating for SINR Variations; Arne Simonsson and Anders Furuskär; Ericsson. Date of publication—2008; consisting of 5-pages.
R1-074850; 3GPP TSG-RAN WG1 #51 ; Title: Uplink Power Control for E-UTRA—Range and Representation of P0 Source: Ericsson; Agenda Item: 6.4.2; Document for: Discussion and Decision; Date and Location: Nov. 5-9, 2007, Jeju, Korea; consisting of 3-pages.
ETSI TS 136 213 V14.4 0; LTE;Evolved Universal Terrestrial Radio Access (E-UTRA); Physical layer procedures (3GPP TS 36213 version 14.4.0 Release 14); Oct. 2017; Consisting of 464-pages.

\* cited by examiner

ALTITUDE DEPENDENT UPLINK POWER CONTROL

CROSS-REFERENCE TO RELATED APPLICATIONS

This application is a Submission Under 35 U.S.C. § 371 for U.S. National Stage Patent Application of International Application No.: PCT/SE2018/051051, filed Oct. 16, 2018 entitled "ALTITUDE DEPENDENT UPLINK POWER CONTROL," which claims priority to U.S. Provisional Application No.: 62/631,310, filed Feb. 15, 2018, the entireties of both of which are incorporated herein by reference.

TECHNICAL FIELD

Disclosed are embodiments related to uplink power control.

BACKGROUND

Uplink (UL) power control are designed to control the transmit power of the different uplink physical channels, including the Physical Uplink Shared Channel (PUSCH).

PUSCH Power Control for LTE

As defined in 3GPP TS 36.213 v 14.4.0 section 5.1.1.1, the power control function for PUSCH is:

$$P\_PUSCH(i) = \min\{P\_CMAX(i), 10 \log(M\_PUSCH(i)) + P\_O\_PUSCH(j) + alpha(j) * PL + Delta\_TF(i) + f(i)\} \quad (Eq.\ 0),$$

where i is the subframe number, j is 0 or 1 (toggling), M_PUSCH(i) is the number of resource blocks allocated for the UE, P_O_PUSCH(j) is equal to P_O_NOMINAL_PUSCH(j)+P_O_UE_PUSCH(j), where P_O_NOMINAL_PUSCH(j) and P_O_UE_PUSCH(j) for j=0, 1 come from higher layer, i.e. P_O_NOMINAL_PUSCH(j) come from p0-NominalPUSCH in SIB2, P_O_UE_PUSCH(j) derives from p0-UE-PUSCH (e.g, SIB2,RRC Connection Setup, RRC Connection Reconfig), and alpha(j): can be any one of $\{0, 0.4, 0.5, 0.6, 0.7, 0.8, 0.9, 1\}$. The specified value come from higher layer signaling via SIB2 (described below).

The parameter alpha (also denoted a) represents the so called fractional path loss compensation, aiming to balance how much path loss is compensated for. The power control scheme can be categorized based on the value of alpha, where alpha=1 implies full compensation of path loss, 0<alpha<1 implies fractional compensation of path loss (i.e. fractional power control), and alpha=0 means no compensation of path loss, that in turn results in no power control; i.e. all users will use the maximum allowed transmission power (P_CMAX).

In simulation studies (see reference [1]) an alpha value of 0.7 is found to give a good trade-off between cell-edge bitrate and capacity. Furthermore, in the simulation approach the parameter alpha value is established assuming certain pathloss models (exponent) and specific assumptions on shadow fading (e.g. log-normally distributed, with some, e.g. 8 dB standard deviation) and multipath fading according to some model (e.g. SCM, sub-urban macro).

For free space propagation the cells are less isolated and interference caused by an increase of power is more severe. For example, power is more interference "costly" and the gain vs. cost of power increase is lower. Then the optimal alpha factor is lower approaching 0.5. Further details on LTE PUSCH power control are described in reference [1].

Other Instances of Fractional Path Loss Compensation Related to Power Control

Apart from PUSCH, other instances also being considered for fractional path loss compensation are, for example, the setting of the UE Transmit power $P_{SRS}$ for the SRS transmitted on sub-frame i for serving cell c (with frame structure type2, and not configured for PUSCH/PUCCH transmission) defined by:

$$P_{SRS,c}(i) = \min\{P_{CMAX,c}(i), 10 \log_{10}(M_{SRS,c}) + P_{O\_SRS,c}(m) + \alpha_{SRS,c} \cdot PL_c + f_{SRS,c}(i)\}$$

and in power headroom calculations, basically according to (given that UE transmits PUSCH without PUCCH in sub-frame i for serving cell c):

$$PH_{type1,c}(i) = P_{CMAX,c} - \{10 \log_{10}(M_{PUSCH,c}(i)) + P_{O\_PUSCH,c}(j) + \alpha_c(j) + PL_c + \Delta_{TF,c}(i) + f_c(i)\}$$

Power Control Parameters in SIB

Power control settings for the UE to use for uplink transmissions are conveyed in system information block signaling (SIB). For PUSCH, system information block type 2 (SIB2) typically contains the following information (see 3GPP TS 36.331)

```
SystemInformationBlockType2 ::= SEQUENCE {
    ac-BarringInfo SEQUENCE {
        ac-BarringForEmergency BOOLEAN,
        ac-BarringForMO-Signalling AC-BarringConfig OPTIONAL, -- Need OP
        ac-BarringForMO-Data AC-BarringConfig OPTIONAL -- Need OP
    } OPTIONAL, -- Need OP
    radioResourceConfigCommon    RadioResourceConfigCommonSIB,
    ue-TimersAndConstants        UE-TimersAndConstants,
    freqInfo                     SEQUENCE {
    ...
``` where,

```
RadioResourceConfigCommonSIB ::= SEQUENCE {
    rach-ConfigCommon          RACH-ConfigCommon,
    bcch-Config                BCCH-Config,
    pcch-Config                PCCH-Config,
    prach-Config               PRACH-ConfigSIB,
    pdsch-ConfigCommon         PDSCH-ConfigCommon,
    pusch-ConfigCommon         PUSCH-ConfigCommon,
    pucch-ConfigCommon         PUCCH-ConfigCommon,
    soundingRS-UL-ConfigCommon SoundingRS-UL-ConfigCommon,
    uplinkPowerControlCommon   UplinkPowerControlCommon
    ...
``` and

```
UplinkPowerControlCommon ::=     SEQUENCE {
    p0-NominalPUSCH              INTEGER (-126..24),
    alpha                        Alpha-r12,
    p0-NominalPUCCH              INTEGER (-127..-96),
    deltaFList-PUCCH             DeltaFList-PUCCH,
    deltaPreambleMsg3            INTEGER (-1..6)
}
```

The factor alpha represents the path loss compensation factor as described in previous section, and is represented according to:

Alpha-r12::=ENUMERATED{a10,a104,a105,a106, a107,a108,a109,a11}.

As noted in the previous section, an alpha value of 0.7 is found to give a good trade-off between cell-edge bitrate and capacity given certain radio environment assumption and characteristics.

SUMMARY

In a scenario where base stations (BSs), for example a 3GPP base station, such as an eNB or gNB, or a non-3GPP base station, such as Wi-Fi access point, become airborne the corresponding radio propagation models describing the radio environment will not be the same as the radio environment on ground level. For example, if an eNB and its served UEs move above rooftops, shadow fading objects, such as other buildings, will no longer be present, at least not to the same degree, and nearby objects contributing to multi-path reflections will in equal manner not be present in the same manner as on ground level.

In recently proposed solutions to cope with radio network nodes operating at altitudes above most nodes today, an improved ANR mechanism that takes UEs altitude into consideration is being proposed. The suggested solution is to use altitude information in the NRT to identify beneficial cell relations for UEs (UAVs) operating at different altitudes. That would enable more efficient utilization of radio network resources as more relevant cells are considered for a UE's handover. In practice, one preferred enablement is to update the corresponding NRT with entries reflecting certain UE altitudes. As a UE detects a new cell, given that the network knows the UE's current height, the network can select how to handle corresponding cell relations efficiently; further exemplified in Table 1 below.

TABLE 1

Table 1: NRT with UE altitude entries; table entity 'UE altitude: ground level' represents today's approach of not resolving cell relations with respect to UE height)

| NR | TCI | UE altitude: ground level | | | UE altitude: intermediate | | | UE altitude: high | | |
|---|---|---|---|---|---|---|---|---|---|---|
| | | No re- move | No HO | No X2 | No re- move | No HO | No X2 | No re- move | No HO | No X2 |
| 1 | TCI#1 | | | | x | | | | x | x |
| 2 | TCI#1 | x | | x | | x | x | | x | X |
| 3 | TCI#1 | x | | | | x | x | | | |

Apart from mobility aspects, for example, LTE UL power control schemes could benefit from using altitude-based parameter settings and/or optimizations.

In today's optimization of LTE, parameter settings are, for the sake of simplicity, assumed for UEs at ground level with certain radio propagation conditions. But in future radio network deployments, both UEs (in terms of UAVs) and BSs (e.g., eNBs, gNBs, etc.) will likely become airborne, hence their altitude may change over time (with time scales potentially on minutes/fraction of hours). This further implies that the radio propagation environment will change over time and that certain radio resource management algorithms should be further optimized with respect to operation altitude. With the current state of the art solutions, e.g. UE/UAV, uplink power control is not considering the other radio propagation environment resulting from operational altitude.

Hence, there are no entries in corresponding SIB signaling entities that can instruct involved RRM parameters to use other settings merely to cope with other radio characteristics, e.g., due to a UE operating at zero altitude at time instance t=t1 whereas same UE might operate at 200 m altitude at time t=t1+X seconds/minutes. Neither can it cope with different UEs at different altitude at the same time instant.

In SIB2 there is an entry containing information on PUSCH power control parameters. Embodiments disclosed herein extend the current signaling entity with entries that are dependent on UE operational altitude. For example, an altitude-dependent factor for the alpha parameter, or one parameter range for zero (ground level, default as per of today), one parameter range for intermediate altitude operation, and one entry for high-altitude operations, so that an airborne UE can select its appropriate power control parameters.

In a further embodiment, the fractional power control for PUSCH is updated also to include UE's altitude, and parameters describing the altitude where fraction alpha shall be used, and a parameter to set how much alpha shall be reduced per elevation distance unit.

Accordingly, in one aspect there is provided a method performed by a base station (BS). In one embodiments, the method includes the BS generating a message comprising a SIB, wherein the SIB includes: i) a set of two or more alpha values where each one of the alpha values is associated with a different altitude and/or ii) an altitude factor. The method further includes the BS transmitting the generated message. In some embodiments, the SIB includes the altitude factor, altFact, and also includes an altitude reference, altRef. In such an embodiment, the SIB may further include an alpha compensation parameter, POalphaComp. In some embodiments, the SIB includes the set of alpha values and the SIB further includes a set of two or more alpha compensation parameters, wherein each one of the alpha compensation parameters is associated with an altitude with which one of the alpha values is associated.

In another embodiment, the method performed by the BS includes the BS determining a UE's altitude, obtaining a power control parameter (e.g., the alpha parameter) based on the determined altitude of the UE, and transmitting to the UE a message comprising the obtained power control parameter so that the UE can use the obtained power control parameter to calculate a power control value and then use the power control value to control an UL transmit power. In some embodiments, the power control parameter is the alpha parameter, and obtaining the alpha parameter comprises selecting an altitude (e.g., selecting a relative altitude) based on the determined UE's altitude and identifying an alpha parameter that is associated with the selected altitude. In some embodiments, the power control parameter is the alpha parameter, and obtaining the alpha parameter comprises calculating: (D×altFactor)+$\alpha_{def}$, where D is a difference between the UE's altitude and reference altitude (altRef) and $\alpha_{def}$ is a default alpha parameter.

In another aspect there is provided a BS that is adapted to perform any one of the BS methods described herein. Such a BS may include processing circuitry and memory storing instructions that are executed by the processing circuitry.

In another aspect, there is provided a method performed by a UE. In some embodiments, the method includes the UE determining its altitude, calculating a power control value (e.g., $P_{PUSCH}$) using the determined altitude, and controlling a transmit power based on the calculated power control value. In some embodiments, the step of calculating the power control value comprises the UE determining a UE altitude value, UEalt, based on the determined altitude of the UE, calculating a value, V, equal to (altRef−UEalt), wherein altRef is a predetermined altitude reference value, and using V to calculate the power control value. In some embodiments, the step of using V to calculate the power control value comprises calculating V×altFactor+alpha, wherein alt-Factor is a predetermined altitude factor and alpha is a predetermined alpha value. In some embodiments, the method also includes the UE receiving a SIB transmitted by a base station, wherein the SIB comprises altRef, altFactor and alpha. In some embodiments, the step of calculating the power control value comprises the UE selecting an altitude based on the determined altitude of the UE, the UE identifying, from a set of two or more alpha values, an alpha value associated with the selected altitude, and the UE calculating the power control value using the identified alpha value. In such an embodiment, the method may further include the UE receiving a SIB transmitted by a base station, wherein the SIB comprises the set of alpha values.

In another aspect there is provided a UE that is adapted to perform any one of the UE methods described herein. Such a UE may include processing circuitry and memory storing instructions that are executed by the processing circuitry.

The above embodiments are advantageous in that they enable more efficient utilization of radio network resources as more relevant/accurate pathloss compensation is applied when the UE operates in different radio propagation environments (due to its operational altitude).

BRIEF DESCRIPTION OF THE DRAWINGS

The accompanying drawings, which are incorporated herein and form part of the specification, illustrate various embodiments.

DETAILED DESCRIPTION

Figure 1:
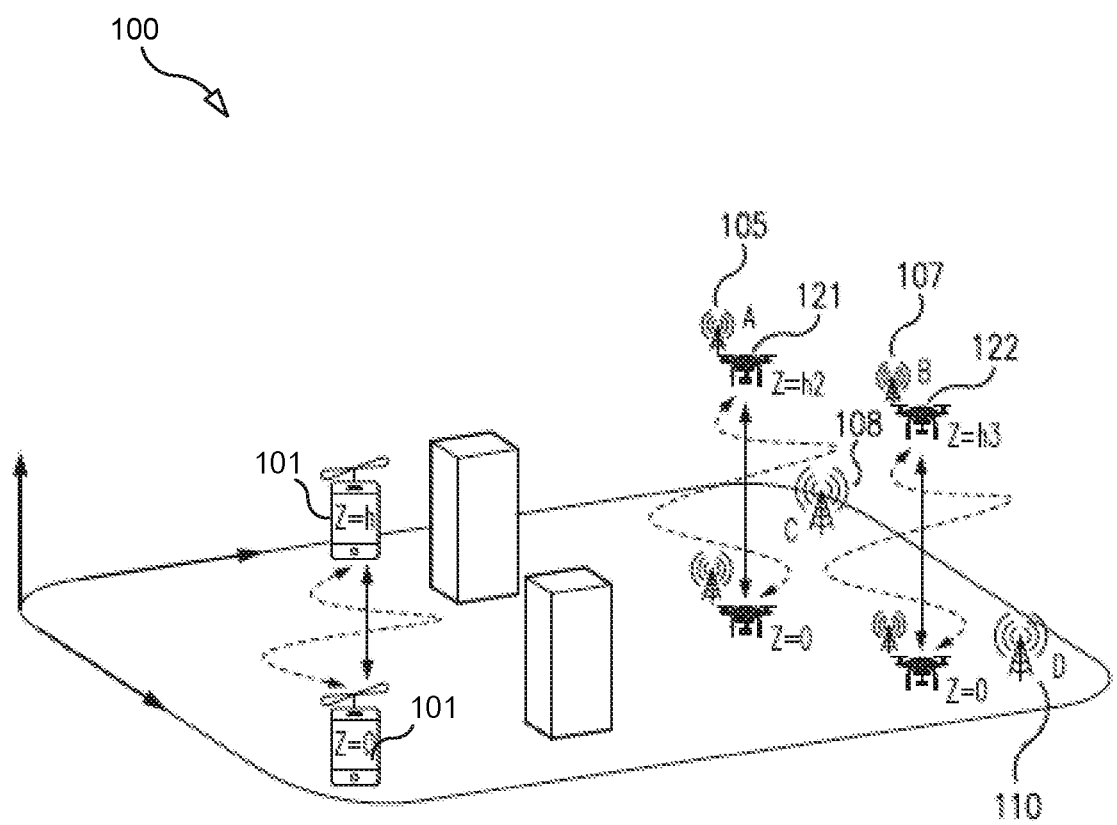
FIG. 1 illustrates a radio network according to some embodiments.

FIG. 1 illustrates a network 100 according to an exemplary embodiment. Network 100 includes the following network nodes: a UE 101, a first BS 105, which may be connected to (or located inside of) an unmanned aerial vehicle (UAV) 121, a second BS 107, which may be connected to (or located inside of) UAV 122, a first ground-based BS 108, and a second ground-based BS 110. As shown in FIG. 1, UE 101, BS 105 and BS 107 can each move in all three dimensions; thus, each of these nodes may have a time-varying altitude.

Figure 2A:
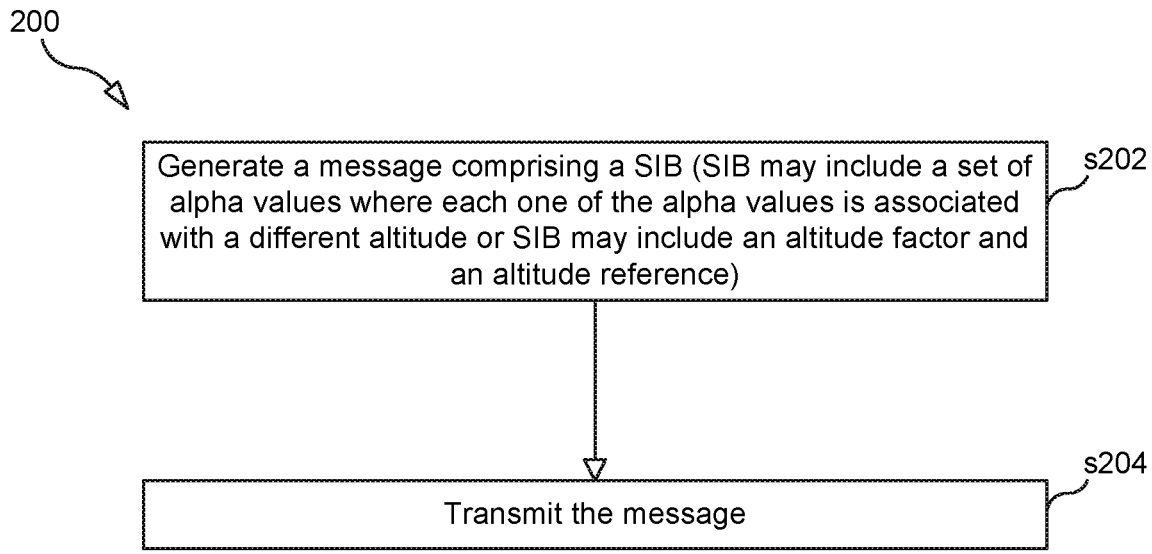
FIG. 2A is a flow chart illustrating a process according to one embodiment.

FIG. 2A is a flow chart illustrating a process 200, according to some embodiments, that is performed by a base station, for example, BS 105. Process 200 may begin with step s202, in which BS 105 generates a message comprising a System Information Block (SIB) (e.g., SIB-2), wherein the SIB comprises information enabling a UE receiving the SIB to compute a power control function (e.g., P_PUSCH, which is also denoted $P_{PUSCH}$) that takes into account the UE's altitude.

For example, in a continuous alpha-compensation embodiment, the SIB comprises an altitude-dependent factor (altFactor) for use in modifying the alpha parameter, which may also be included in the SIB. In such an embodiment, the SIB may also comprise an altitude reference parameter (altRef). Also, in this embodiment the SIB may include an alpha compensation parameter (POalphaComp).

In another embodiment, as an alternative to continuous alpha-compensation, the SIB includes a set of two or more alpha values, wherein each alpha value in the set is associated with a different altitude (e.g., a different relative altitude or "altitude region"). In such an embodiment, the SIB may also include a set of alpha compensation parameters, wherein each alpha compensation parameters included in the set is associated with a different altitude (e.g., low altitude, medium altitude, and high altitude). For example, the SIB may include the following information, as illustrated in table 2:

TABLE 2

| Altitude | Alpha ($\alpha$) | Alpha Compensation Param (POalphaComp) |
| --- | --- | --- |
| Low | 0.7 | P1 |
| Medium | 0.6 | P2 |
| High | 0.5 | P3 |

As the above illustrates, the SIB includes a set of three alpha values, wherein each one of the alpha values is associated with a different relative altitude. Likewise, the SIB includes a set of three alpha compensation parameters, wherein each one of the parameters is associated with one of the different altitudes. The SIB may also include information (e.g., a vector) that defines the different relative altitudes. For instance, the SIB may include i) information defining the "low" altitude as any altitude below X meters, ii) information defining the "medium" altitude as any altitude above or equal to X meters, but less than Y meters, and ii) information defining the "high" altitude as any altitude above Y meters. These altitude region settings can, for example, be cell specific and be selected based on building heights and ground level topology in the specific cell.

In step s204, BS 105 transmits (e.g., broadcasts) the message.

Figure 2B:
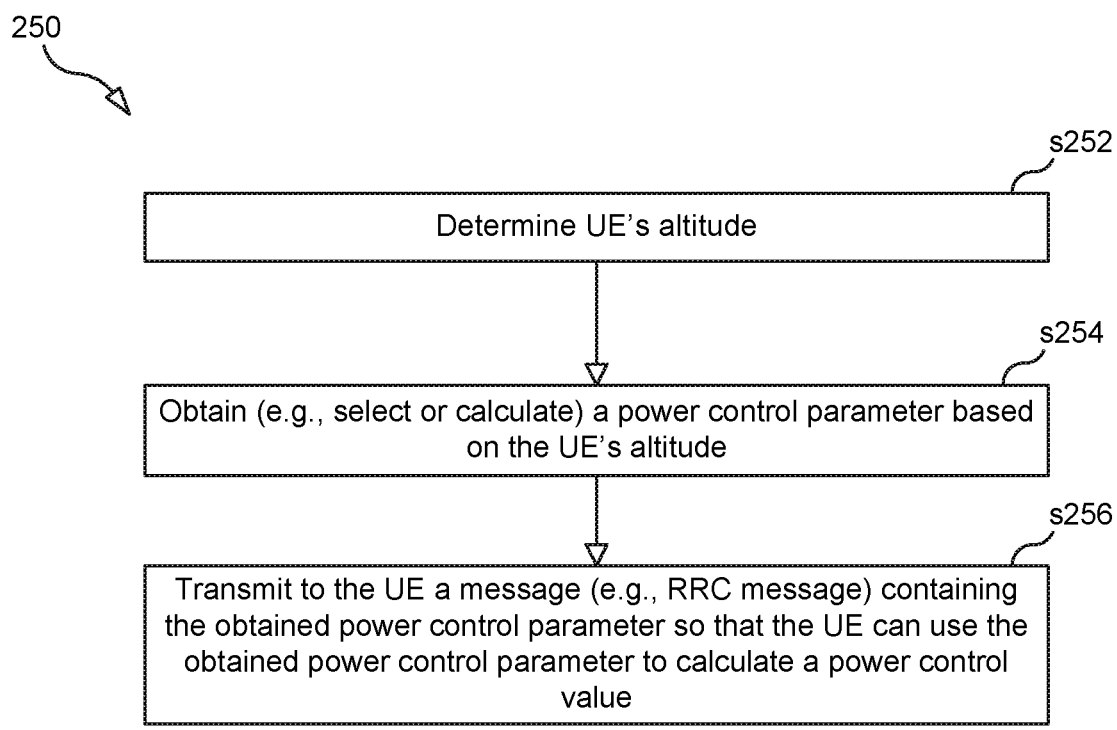
FIG. 2B is a flow chart illustrating a process according to one embodiment.

FIG. 2B is a flow chart illustrating a process 200, according to some embodiments, that is performed by a base station, for example, BS 105. Process 200 may begin with step s252, in which BS 105 determines UE 101's altitude. The altitude of UE 101 can be determined in several different ways. For example, the altitude of UE 101 can be determined by the BS from direction of arrival angle and timing advance. As another example, the BS can determine UE 101's altitude from an altitude report transmitted to the BS by, for example, UE 101, which can determine its own altitude using, for example, a barometric sensor, UAV flight equipment/recorder, or any other altitude measuring unit. For instance, the UE or other device may periodically (or via a trigger) send an altitude report to the BS indicating UE 101's altitude.

In step s254, the BS obtains a power control parameter (e.g., the alpha parameter) based on the determined altitude of the UE. For example, the BS may obtain the alpha parameter by selecting an altitude (e.g., selecting a relative altitude) based on the UE's altitude determined in step s252 and then identifying the alpha parameter that is associated with the selected altitude. As another example, the BS may obtain the alpha parameter (α) by calculating: (D×altFactor)+$α_{def}$, where D is a difference between the UE's altitude (e.g., a filtered version of the UE's altitude) and reference altitude (altRef) and $α_{def}$ is a default alpha parameter.

In step s256, the BS transmits to UE 101 a message (e.g., an RRC message) containing the obtained power control parameter so that UE 101 can use the obtained power control parameter to calculate a power control value and then use the power control value to control an UL transmit power.

Figure 3:
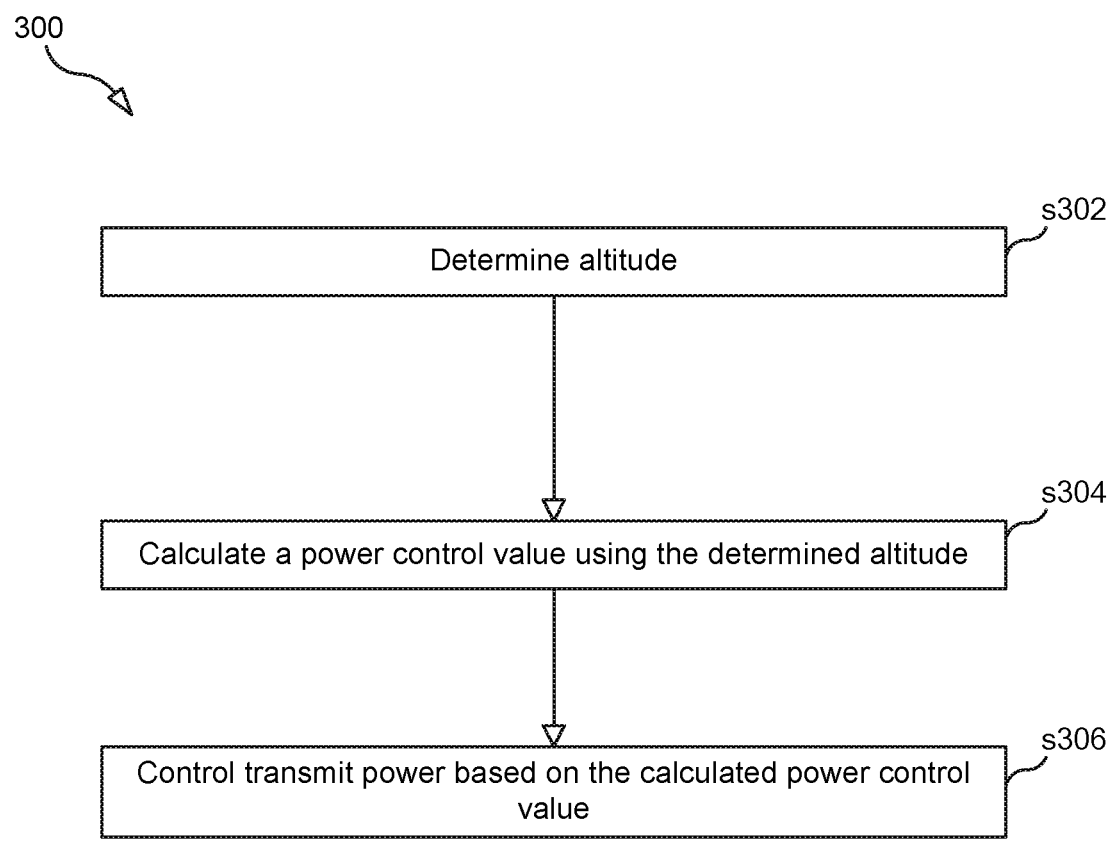
FIG. 3 is a flow chart illustrating a process according to one embodiment.

FIG. 3 is a flow chart illustrating a power control process 300, according to a generic embodiment, that is performed by UE 101. Process 300 may begin with step s302, in which UE 101 determines its current altitude (e.g., 50 meters). In step s304, UE 101 calculates a power control value (e.g., P_PUSCH) using the determined altitude. For example, in step s304, UE 101 may determine UEalt, which is a filtered version of the altitude determined in step s302, and then use UEalt to calculate the power control value. For example, in step s304, UE 101 may calculate a value equal to (altRef−UEalt) and then use the calculated value to calculate the power control value. As another example, UE 101 may use UEalt to select an alpha value from a set of alpha values and then use the selected alpha value to calculate the power control value. In step s306, UE 101 controls a transmit power based on the calculated power control value.

Figure 4:
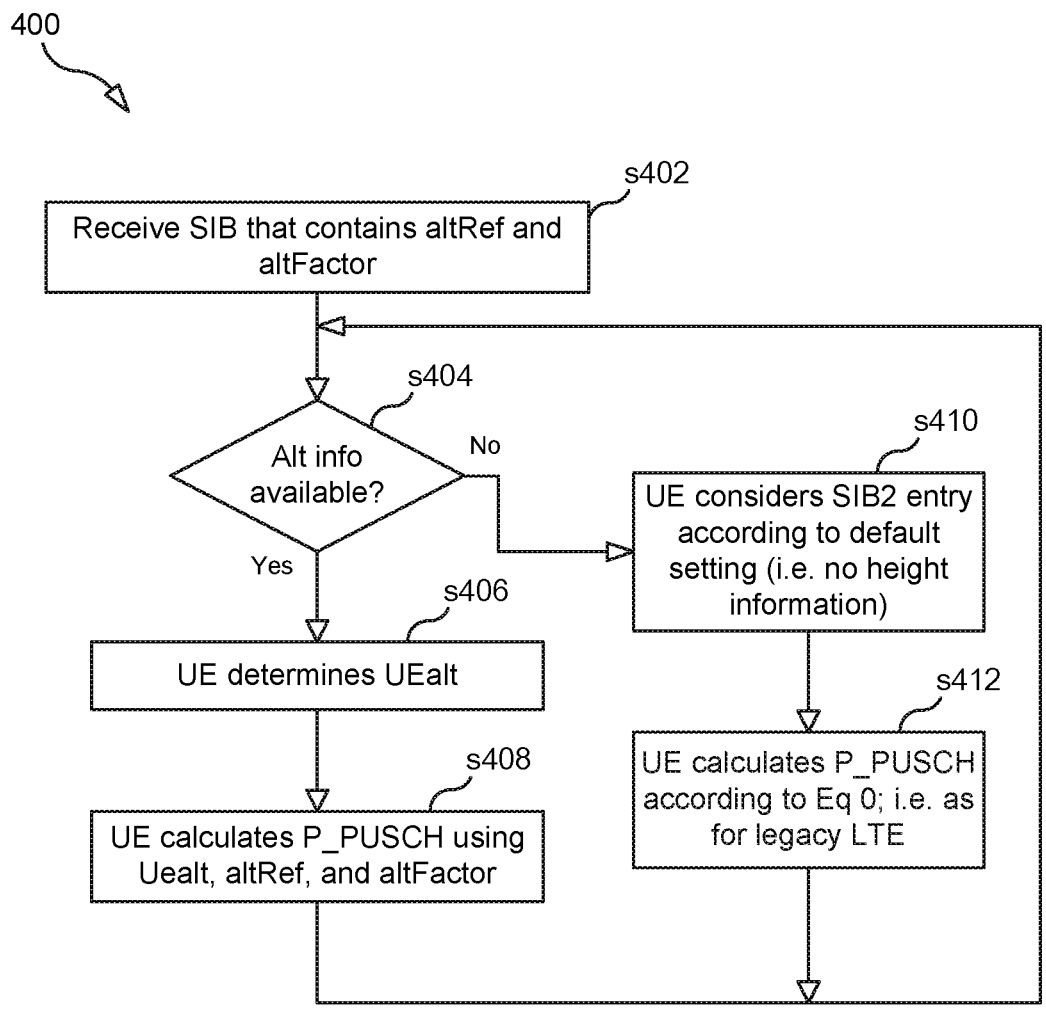
FIG. 4 is a flow chart illustrating a process according to one embodiment.

FIG. 4 is a flow chart illustrating a power control process 400, according to some embodiments, that is performed by UE 101. Process 400 may begin with step s402, in which UE 101 receives a SIB (e.g., SIB-2) transmitted by a BS (e.g., BS 105). In this embodiment, the SIB includes the altitude-dependent factor (altFactor) and the altitude reference parameter (altRef).

In step s404, UE 101 determines whether it can obtain altitude information indicating its altitude (e.g., a value identifying UE 101's height above sea level or ground level). If it can obtain the altitude information, UE 101 obtains the information and determines a filtered altitude value (UEalt) based on the altitude information (step s406). If it cannot obtain the altitude information, the process proceeds to step s410.

In step s408, UE 101 calculates a power control value (e.g., P_PUSCH) using UEalt, altRef, and altFactor. For example, in step s408 UE 101 calculates:

$$P_{PUSCH}(i) = \min\{P_{CMAX}, (10 \log_{10}(M_{PUSCH}(i)) + P_{O\_PUSCH}(j) + α_{adj}(j) \times PL + Δ_{TF}(I) + f(i))\},$$

where $$α_{adj}(j) = α(j) + \text{altFactor} \times D_{alt}, \text{ where}$$

$D_{alt}$ is a difference between altRef and UEalt (e.g., $D_{alt}$=(altRef−UEalt), or $D_{alt}$=(UEalt−altRef)).

In step s410, UE 101 obtains default power control parameters from the SIB and then in step s412 calculates the power control value using the default values.

In some embodiments, the $P_{O\_PUSCH}$ setting should furthermore be adjusted according to alpha change as described in reference [2], as:

$$P_{O\_PUSCH} = α \cdot (SINR_0 + IN) + (1-α) \cdot (P_{max} - 10 \log M_0) \quad (2)$$

where SINR0 is the SINR achieved when P=Pmax for M=M0.

$$P_{O\_PUSCH} = α \cdot (SINR_0 + IN) + (1-α) \cdot (P_{max} - 10 \log M_0) \quad (3)$$

SIB2 configuration parameter for PO adjustment can be reduced as:

$$P_{O\_PUSCH\_ADJ} = α \cdot (SINR_0 + IN - P_{max} + 10 \log M_0) + P_{max} - 10 \log M_0 = α \cdot P O\text{alphaComp} + P_{O\_PUSCH} \quad (4)$$

And SIB2 parameter POalphaComp can be configured accordingly and the UE adjusts $P_{O\_PUSCH}$ based on altitude adjusted alpha according to (4).

A complete altitude compensating UE PUSCH power control can be specified as:

$$P_{PUSCH}(i) = \min\{P_{CMAX}, 10 \log_{10}(M_{PUSCH}(i)) + P_{O\_PUSCH\_ADJ}(j) + α_{adj}(j) \times PL + Δ_{TF}(I) + f(i))\},$$

where $$P_{O\_PUSCH\_ADJ}(j) = α \cdot P O\text{alphaComp} + P_{O\_PUSCH}$$

The total alpha factor can be limited to the range 0.5 to 1 ranging from free-space optimal value to UE at low altitude isolated from neighbor cells not causing any significant interference. The corresponding max and min values can also be SIB2 parameters.

Figure 5:
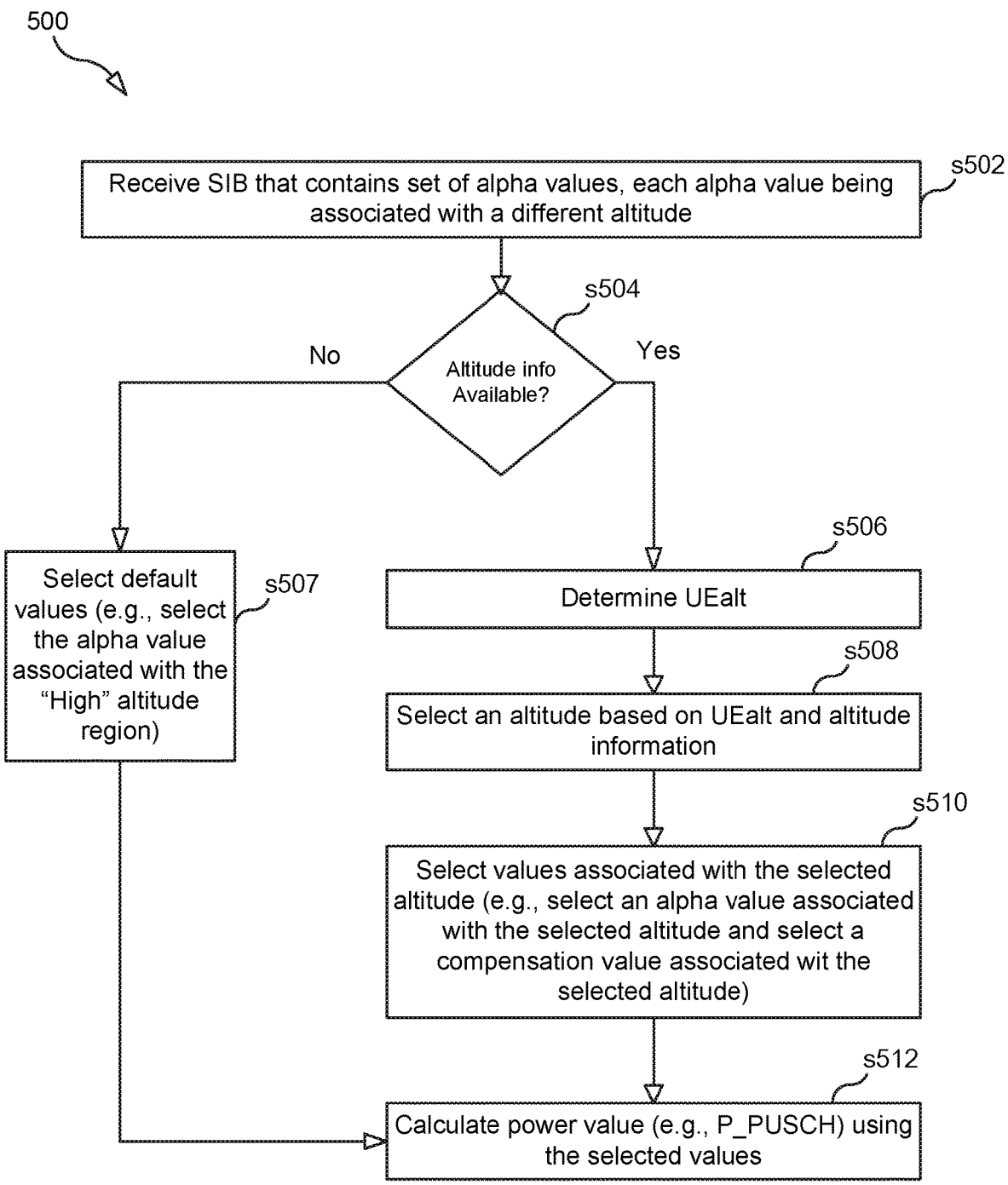
FIG. 5 is a flow chart illustrating a process according to one embodiment.

FIG. 5 is a flow chart illustrating a power control process 500, according to some embodiments, that is performed by UE 101. Process 500 may begin with step s502, in which UE 101 receives a SIB (e.g., SIB-2) transmitted by a BS (e.g., BS 105).

In step s504, UE 101 determines whether it can obtain altitude information indicating its altitude (e.g., a value identifying UE 101's height above sea level or ground level). If it can obtain the altitude information, UE 101 obtains the information and determines a filtered altitude value (UEalt) based on the altitude information (step s506). If it cannot obtain the altitude information, the process proceeds to step s507.

In step s507, UE 101 selects default power control parameter values. For example, if UE 101 is in, on or part of a UAV, but the UE 101 cannot obtain its altitude information, then UE 101 may be configured to select a conservative setting (e.g., the parameters associated with the "high" altitude). As another example, a non-UAV UE 101 (i.e., a that generally stays on the ground) may be configured to select a less conservative setting (e.g., the parameters associated with the "low" altitude).

In step s508, which follows step s506, UE 101 selects an altitude (e.g., a relative altitude such as Low, Medium or High) based on UEalt. For example, in step s508, UE 101 uses UEalt and altitude information to select an altitude corresponding to UEalt. This altitude information may be included in the SIB. For example, the altitude information may be a vector of N altitude values, wherein each altitude value defines an altitude region boundary. Here is an example of such a vector: {25 m, 250 m}. This vector defines three relative altitudes, which may be labeled as "low", "medium," and "high." Specifically, the vector specifies that: 1) any altitude less than 25 m is a "low" altitude; 2) any altitude greater than or equal to 25 but less than 250 is a "medium" altitude, and 3) any altitude greater than or equal to 250 is a "high" altitude.

In step s510, UE 101 selects power control parameter values (e.g., an alpha value and an alpha compensation parameter) based on the altitude selected in step s508. For instance, using table 2 (above) as an example, if the selected altitude is the "medium" altitude, then, in step s510, UE 101 selects an alpha value of 0.6 and the P2 alpha compensation parameter.

In step s512, UE 101 uses the power control parameters selected in either step s507 or step s510 to calculate a power control value (e.g., $P_{PUSCH}$). For instance, using the example above where step S510 is performed and the selected altitude is the "medium" altitude, UE 101 may calculate:

$$P_{PUSCH}(i) = \min\{P_{CMAX}, 10 \log_{10}(M_{PUSCH}(i)) + P_{O\_PUSCH\_ADJ}(j) + \alpha_{adj}(j) \times PL + \Delta_{TF}(I) + f(i))\},$$

where $\alpha_{adj}(j) = 0.6$, and $P_{O\_PUSCH\_ADJ}(j) = \alpha \cdot P2 + P_{O\_PUSCH}$.

While the above examples have illustrated three relative altitudes (or altitude regions), N number of relative altitudes may be defined, N>3. If N relative altitudes are defined, then the SIB may contain N alpha value and N alpha compensation parameters, one for each of the N relative altitudes.

In some embodiments, the flight altitude regions and correspondingly associated values of alpha could be shared with neighboring eNBs, potentially over the X2 interface.

Also, in some embodiments, the altitude and flight altitude selection could furthermore be filtered with respect to UAV's current vehicle speed over ground and rate of climb/decent (i.e. vertical velocity component), and vehicle's current flight altitude.

In some embodiments, the altitude of UE 101 can be estimated by a BS (e.g., the BS serving UE 101) from direction of arrival angle and timing advance. The altitude can be signaled to the UE or a UE specific alpha setting according the altitude can be configured by RRC-signaling.

Figure 6:
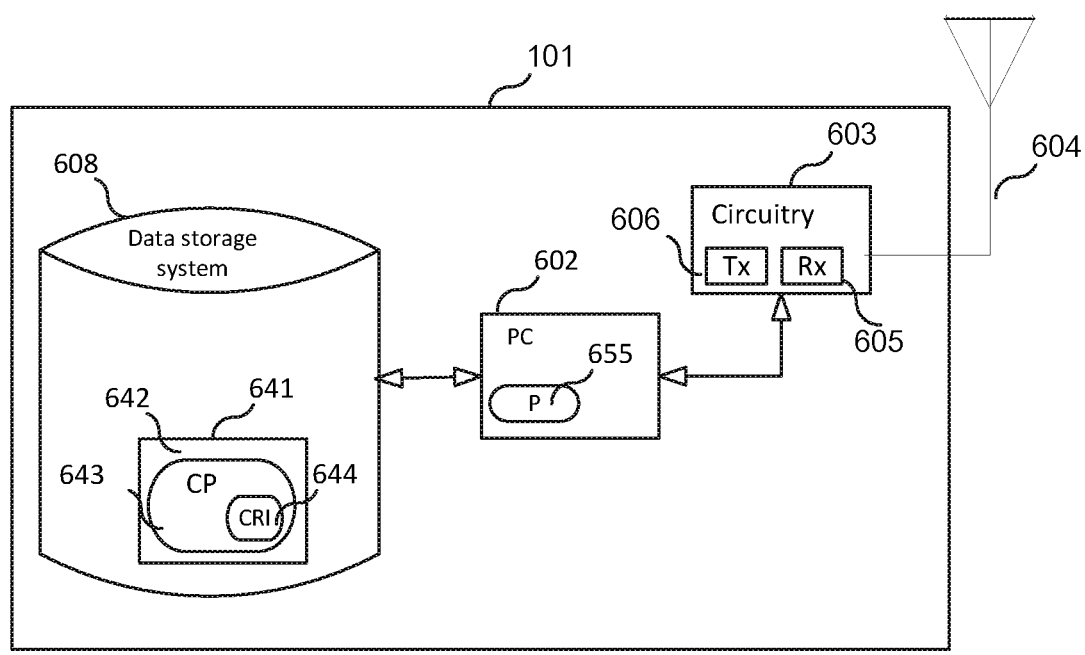
FIG. 6 is a block diagram of a UE according to one embodiment.

FIG. 6 is a block diagram of UE 101 according to some embodiments. As shown in FIG. 6, UE may comprise: processing circuitry (PC) 602, which may include one or more processors (P) 655 (e.g., a general purpose microprocessor and/or one or more other processors, such as an application specific integrated circuit (ASIC), field-programmable gate arrays (FPGAs), and the like); circuitry 603 (e.g., radio transceiver circuitry comprising an Rx 605 and a Tx 606) coupled to an antenna system 604 for wireless communication with other UEs and/or base stations, such as 3GPP base stations or other base stations); and local storage unit (a.k.a., "data storage system") 608, which may include one or more non-volatile storage devices and/or one or more volatile storage devices (e.g., random access memory (RAM)). In embodiments where DPA 602 includes a programmable processor, a computer program product (CPP) 641 may be provided. CPP 641 includes a computer readable medium (CRM) 642 storing a computer program (CP) 643 comprising computer readable instructions (CRI) 644. CRM 642 may be a non-transitory computer readable medium, such as, but not limited to, magnetic media (e.g., a hard disk), optical media, memory devices (e.g., random access memory, flash memory), and the like. In some embodiments, the CRI 644 of computer program 643 is configured such that when executed by data processing apparatus 602, the CRI causes UE to perform steps described herein (e.g., steps described herein with reference to the flow charts and/or message flow diagrams). In other embodiments, UE may be configured to perform steps described herein without the need for code. That is, for example, DPA 602 may consist merely of one or more ASICs. Hence, the features of the embodiments described herein may be implemented in hardware and/or software.

Figure 7:
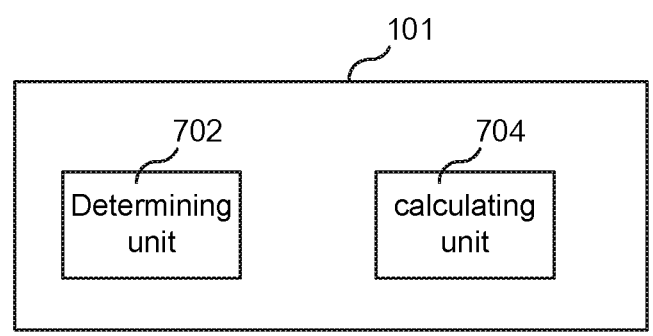
FIG. 7 is a diagram showing functional units of a UE according to one embodiment.

FIG. 7 is a diagram showing functional units of UE 101 according to some embodiments. As shown in FIG. 7, the UE 101 may include: a determining unit 702 configured to determine its altitude and a calculating unit 704 configured to calculate a power control value (e.g., $P_{PUSCH}$) using the determined altitude.

Figure 8:
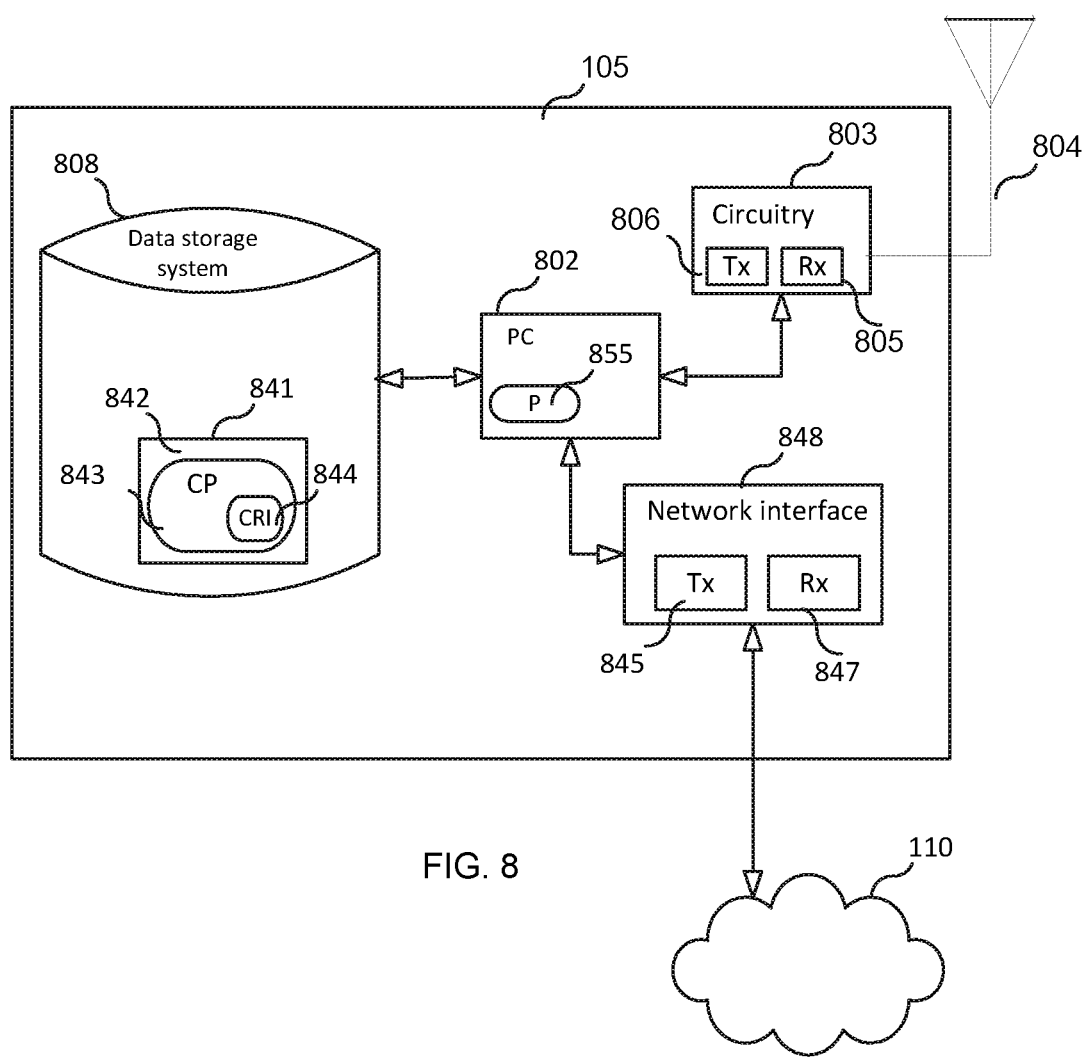
FIG. 8 is a block diagram of a BS according to one embodiment.

FIG. 8 is a block diagram of base station (BS) 105 according to some embodiments. As shown in FIG. 8, BS may comprise: processing circuitry (PC) 802, which may include one or more processors (P) 855 (e.g., a general purpose microprocessor and/or one or more other processors, such as an application specific integrated circuit (ASIC), field-programmable gate arrays (FPGAs), and the like); a network interface 848 comprising a transmitter (Tx) 845 and a receiver (Rx) 847 for enabling the BS to transmit data to and receive data from other nodes connected to a network 110 (e.g., an Internet Protocol (IP) network) to which network interface 848 is connected; circuitry 803 (e.g., radio transceiver circuitry comprising an Rx 805 and a Tx 806) coupled to an antenna system 804 for wireless communication with BSs); and local storage unit (a.k.a., "data storage system") 808, which may include one or more non-volatile storage devices and/or one or more volatile storage devices (e.g., random access memory (RAM)). In embodiments where DPA 802 includes a programmable processor, a computer program product (CPP) 841 may be provided. CPP 841 includes a computer readable medium (CRM) 842 storing a computer program (CP) 843 comprising computer readable instructions (CRI) 844. CRM 842 may be a non-transitory computer readable medium, such as, but not limited to, magnetic media (e.g., a hard disk), optical media, memory devices (e.g., random access memory, flash memory), and the like. In some embodiments, the CRI 844 of computer program 843 is configured such that when executed by data processing apparatus 802, the CRI causes BS to perform steps described herein (e.g., steps described herein with reference to the flow charts and/or message flow diagrams). In other embodiments, BS may be configured to perform steps described herein without the need for code. That is, for example, DPA 802 may consist merely of one or more ASICs. Hence, the features of the embodiments described herein may be implemented in hardware and/or software.

Figure 9A:
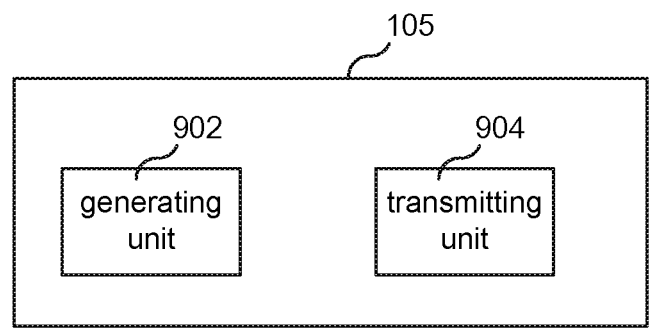
FIG. 9A is a diagram showing functional units of a BS according to one embodiment.

FIG. 9A is a diagram showing functional units of BS 105 according to some embodiments. As shown in FIG. 9A, the BS 105 includes a generating unit 902 for generating a message comprising a SIB, wherein the SIB may include a set of alpha values where each one of the alpha values is associated with a different altitude or the SIB may include an altitude factor and an altitude reference. BS 105 also includes a transmitting unit 904 for employing a transmitter (e.g., transmitter 806) to transmit the generated message.

Figure 9B:
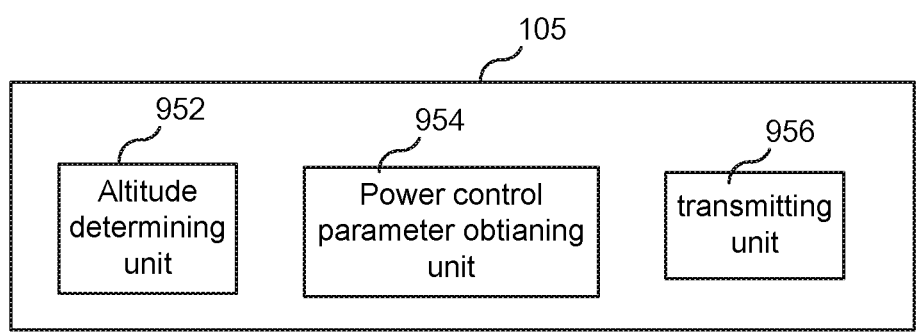
FIG. 9B is a diagram showing functional units of a BS according to one embodiment.

FIG. 9B is a diagram showing functional units of BS 105 according to some embodiments. As shown in FIG. 9B, the BS 105 includes: an altitude determining unit 952 for determining UE 101's altitude; a power control parameter obtaining unit 954 for obtaining a power control parameter based on the determined altitude of UE 101; and a transmitting unit 956 for employing a transmitter (e.g., transmitter 806) to transmit to UE 101 a message (e.g., an RRC message) comprising the obtained power control parameter so that the UE 101 can use the obtained power control parameter to calculate a power control value and then use the power control value to control an UL transmit power.

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

REFERENCES

[1] *Uplink Power Control in LTE—Overview and Performance Principles and Benefits of Utilizing rather than Compensating for SINR Variations*, A. Simonsson et al., conference paper

[2] Ericsson 3GPP TSG-RAN WG1 #51 R1-074850, "Uplink Power Control for E-UTRA-Range and Representation of P0", located at www.3gpp.org/ftp/tsg_ran/WG1_RL1/TSGR1_51/Docs/R1-074850.zip

ABBREVIATIONS

3GPP 3rd Generation Partnership Project'
ANR Automatic Neighbor Relation
eNB Evolved Node B
HO Handover
LoS Line of Sight
LTE Long Term Evolution
NRT Neighbor Relation Table
PL Path Loss
PUSCH Physical Uplink Shared Channel
RRC Radio Resource Control
RRM Radio Resource Management
SIB System Information Block
TS Technical Specification
UAV Unmanned Aerial Vehicle
UE User Equipment
X2 eNB-eNB interface for LTE

The invention claimed is:

1. A method performed by a base station, BS, the method comprising:
   determining a UE's altitude;
   obtaining a power control parameter based on the determined altitude of the UE, the power control parameter being an alpha parameter and obtaining the alpha parameter comprising selecting an altitude based on the determined UE's altitude and identifying an alpha parameter that is associated with the selected altitude; and
   transmitting to the UE a message comprising the obtained power control parameter so that the UE can use the obtained power control parameter to calculate a power control value and then use the power control value to control an UL transmit power.

2. The method of claim 1, wherein the power control parameter is the alpha parameter; and
   obtaining the alpha parameter comprises calculating: $(D \times altFactor) + \alpha_{def}$, where D is a difference between the UE's altitude and reference altitude (altRef) and $\alpha_{def}$ is a default alpha parameter.

3. The method of claim 1, wherein selecting the altitude comprises selecting a relative altitude.

4. A base station, BS, the BS being configured to:
   determine a UE's altitude;
   obtain a power control parameter based on the determined altitude of the UE, the power control parameter being an alpha parameter and obtaining the alpha parameter comprising selecting an altitude based on the determined UE's altitude and identifying an alpha parameter that is associated with the selected altitude; and
   transmit to the UE a message comprising the obtained power control parameter so that the UE can use the obtained power control parameter to calculate a power control value and then use the power control value to control an UL transmit power.

* * * * *